(12) United States Patent
Chang et al.

(10) Patent No.: US 6,869,816 B2
(45) Date of Patent: Mar. 22, 2005

(54) DEPOSITION METHOD FOR BALANCING FILM STRESS

(75) Inventors: Sean Chang, Taoyuan (TW); Chung-Ling Lu, Taipei (TW)

(73) Assignee: Delta Electronics, Inc., Taoyuan Hsien (TW)

(*) Notice: Subject to any disclaimer, the term of this patent is extended or adjusted under 35 U.S.C. 154(b) by 1 day.

(21) Appl. No.: 10/341,803

(22) Filed: Jan. 14, 2003

(65) Prior Publication Data

US 2004/0092052 A1 May 13, 2004

(30) Foreign Application Priority Data

Nov. 8, 2002 (CN) .......................................... 91132981 A

(51) Int. Cl.[7] .............................................. H01L 21/00
(52) U.S. Cl. ........................................... 438/31; 385/131
(58) Field of Search ............................. 438/31; 385/131

(56) References Cited

U.S. PATENT DOCUMENTS

| | | | | |
|---|---|---|---|---|
| 4,358,181 A | * | 11/1982 | Gulati et al. ................ | 385/124 |
| 5,140,665 A | * | 8/1992 | Backer et al. ............... | 385/126 |
| 5,780,164 A | * | 7/1998 | Pyzik et al. ............... | 428/539.5 |
| 6,128,274 A | * | 10/2000 | Mori et al. ............... | 369/275.5 |
| 6,584,256 B2 | * | 6/2003 | Shimada et al. ............ | 385/102 |
| 6,610,361 B1 | * | 8/2003 | Heuer et al. ........... | 427/255.18 |
| 2003/0190131 A1 | * | 10/2003 | Barth ......................... | 385/129 |

OTHER PUBLICATIONS

Suhir, E. "Analytical Modeling of the Interfacial Shearing Stress in Dual–Coated Optical FiberSpecimens Subjected to Tension", Applied Optics, vol. 32, No. 16, 1963 pp3024–3034.*

* cited by examiner

*Primary Examiner*—W. David Coleman
(74) *Attorney, Agent, or Firm*—Birch, Stewart, Kolasch & Birch, LLP

(57) ABSTRACT

A film deposition method for an optical component is used to balance two side film stresses of a substrate. A predetermined number of layers of films is deposited on an upper side of the substrate, and then layers of films with similar thickness are deposited on a lower side of the substrate to balance side film stresses of the substrate.

14 Claims, 4 Drawing Sheets

$$\sigma = \frac{Es \cdot ds \cdot \Delta^2 \delta}{3r^2(1-Vs)\,df} \quad \text{----- (a)}$$

$\sigma$ = film stress
r = substrate measurement radius
$\Delta \delta$ = substrate height difference between before and after deposition
$\nu$ s : Poisson's ratio
Es : Young's modulus
ds : substrate thickness
df : film thickness

DEPOSITION METHOD FOR BALANCING FILM STRESS

BACKGROUND OF THE INVENTION

1. Field of Invention

The present invention relates to a film deposition method. More particularly, the present invention relates to a film deposition method for balancing stress on an optical substrate.

2. Description of Related Art

As data communication via the Internet increases rapidly, the backbone optical cable capacity needs to be upgraded. The requirements for optical components are also demanding. For example, more than one hundred films (thicker than 20 μm) are deposited on a substrate in DWDM filter. Issues previously not of concern become important in manufacturing optical component as the number of film layers increases.

When a DWDM (Dense Wavelength Division Multiplexing) filter is manufactured, all optical films are deposited on a substrate and then the substrate is divided into a desired size. For example, when a round substrate (diameter=90 mm) is employed in the manufacture of DWDM filters, hundreds of films are deposited on the substrate. When the substrate deposited by films is divided, the films peel off or the substrate collapses.

FIG. 1 illustrates the possible results after an optical component is deposited. When thin films are deposited on a substrate, a tensile force may be generated to buckle the substrate or a compressive force may be generated to cause bumps or bubbles on the films. Both the tensile and compressive forces are harmful to process. Taking DWDM optical filter for example, the films peel off or the substrate collapses due to film stress when the substrate deposited by films is divided.

For the forgoing reasons, there is a need to solve the film stress issue when hundreds of films are deposited on an optical component.

SUMMARY OF THE INVENTION

It is therefore an objective of the present invention to provide a deposition method for solving the problem of film stress on a substrate.

In accordance with the foregoing and other objectives of the present invention, a deposition method is employed to balance stresses in both the upper side and the lower side of a substrate in an optical component. Optical films of a predetermined layer number or thickness are deposited on the upper side of the substrate and then stress compensatory layers of the same predetermined layer number or thickness are deposited on the lower side of the substrate.

In one preferred embodiment of the present invention, thin films of high and low refraction index materials are deposited alternately on the upper side of the substrate. On the lower side of the substrate, thin films of an approximate thickness are deposited alternately. The thin films on the lower side comprise stress compensatory layers and another kind of optical film. The stress compensatory layers are designed to avoid affecting the upper side film's optical performance according to the halfwave rules and the optimum design methods.

In another preferred embodiment of the present invention, thin films of high and low refraction index materials are deposited on the upper side of the substrate. On the lower side of the substrate stress, compensatory layers of an approximate thickness are deposited on a useless portion (impenetrable to light during operation) and another kind of optical layer is deposited on a working portion (penetrable to light during operation). In this manner, any films deposited on the lower side do not affect the optical performance of the films on the upper side of the substrate.

In conclusion, the invention provides a deposition method for balancing stresses both on the upper side and lower side of a substrate in an optical component without affecting the original optical performance. That is, thin films of identical or approximate thickness are deposited on both the upper side and lower side of the substrate to solve a problem of unbalanced stress on both sides of the substrate.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
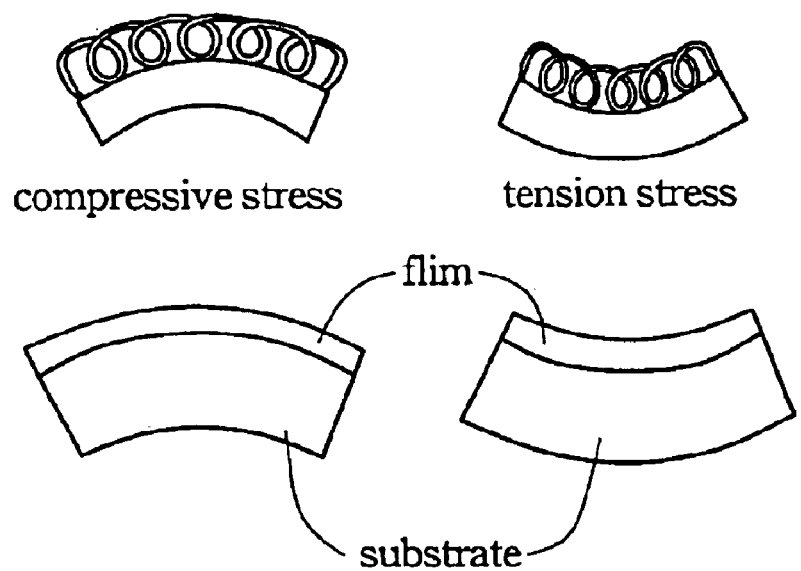
FIG. 1 illustrates the possible results after an optical component is deposited.

Reference will now be made in detail to the present preferred embodiments of the invention, examples of which are illustrated in the accompanying drawings. Wherever possible, the same reference numbers are used in the drawings and the description to refer to the same or like parts.

Figure 2:
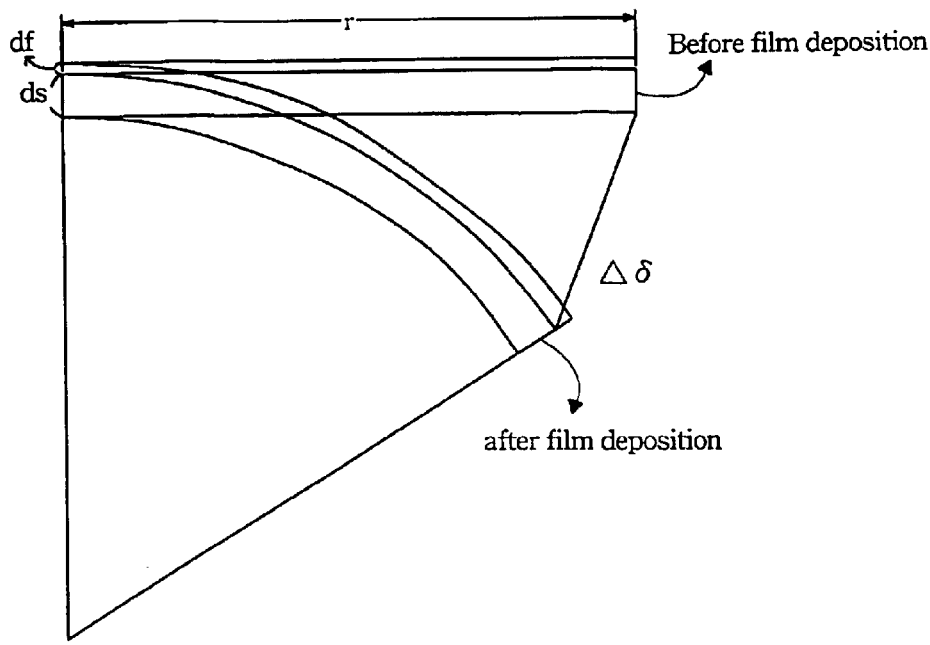
FIG. 2 illustrates a schematic view and an equation for a substrate stress measurement.

The theory employed in present invention is described. FIG. 2 illustrates a schematic view and an equation for a substrate stress measurement. There are two statuses in FIG. 2 including the substrate before deposition and the substrate after deposition. Equation (a) is employed to simulate this phenomenon. If the parameters r, σ, Δδ, vs, and Es in equation (a) are assumed to be constant, equation (a) can be simplified as df=Const*Δδ. That is, the film thickness is directly proportional to substrate bending. In conclusion, the thicker the films deposited, the more the substrate bends. Thus, films with an approximate thickness can generate approximate film stress.

The preferred embodiments of the present invention are further presented using an MEMS (Micro-Electro Mechanical Systems) component.

Figure 3:
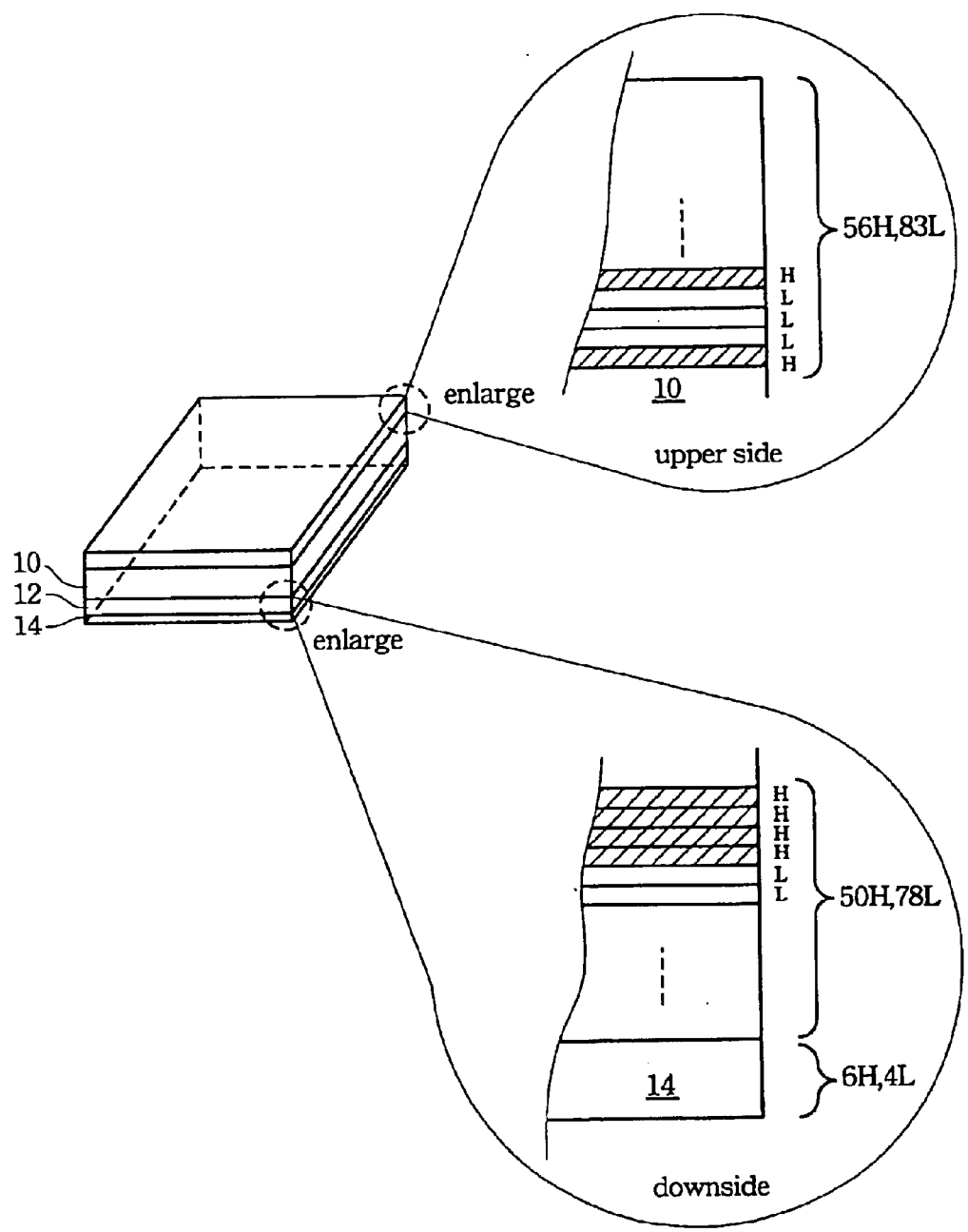
FIG. 3 illustrates a deposition method for balancing film stress according to one preferred embodiment of present invention.

FIG. 3 illustrates a deposition method for balancing film stress according to one preferred embodiment of present invention. In FIG. 3, H represents the ¼ wavelength thin film of high refraction index materials, and L represents the ¼ wavelength thin film of high low index materials. Thus, H or L film thickness may vary according to wavelength demands. In one preferred embodiment of the present invention, a stack of H and L films deposited alternately on the upper side of the substrate 10 are 56 H and 83 L in total. An anti-reflection layer 14 consisting of 6 H and 4 L is deposited alternately on the lower side of the substrate 10. Apparently, a difference between the upper side and lower side of the substrate 10 is 50 H and 79 L in total.

In accordance with the rules mentioned above, a compensatory layer of 50 H and 79 L should be added on lower side of the substrate 10 to compensate for the difference in thickness between the upper side and the lower side of the substrate 10. It is noted that the compensatory layer deposited on the lower side of the substrate 10 does not affect the original optical performance. The method used in present invention is to deposit alternately even numbers of H or L serially. The combination of even numbers of H or L can be referred to as an optical absentee layer. In other words, a compensatory layer of 50 H and 78 or 80 L should be added on the lower side of the substrate 10 to compensate for the difference in thickness between the upper side and the lower side without affecting the original optical performance. Although the thickness difference between the upper side and the lower side is 50 H and 79 L, a compensatory layer of 50 H and 78 or 80 L is deposited on the lower side of the substrate 10 to avoid affecting the original optical performance. Additionally, the film thickness of both sides of the substrate 10 need not be exactly the same. A reasonable difference in thickness is acceptable if the stress caused by the thickness difference does not affect the optical component quality.

Figure 4:
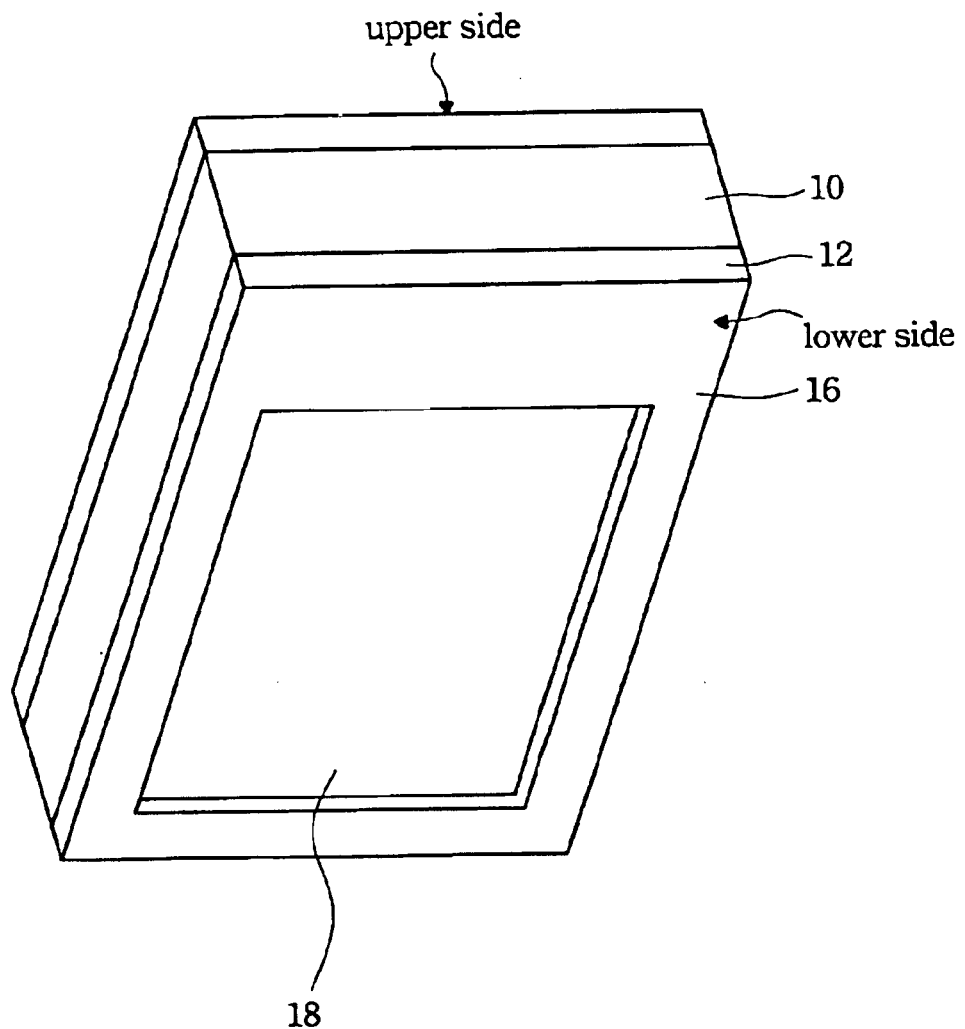
FIG. 4 illustrates a deposition method for balancing film stress according to another preferred embodiment of present invention.

FIG. 4 illustrates a deposition method for balancing film stress according to another preferred embodiment of present invention. Alternatively, the present invention can be carried out by another preferred embodiment. For example, a stack of H and L films deposited on the upper side of the substrate 10 are 56 H and 83 L in total. A compensatory layer 12 (such as 56 H and 82 L) is deposited on a useless portion 16 of the lower side of the substrate 10, and an anti-reflection layer is deposited on the working portion of the lower side of the substrate 10. The method of forming the compensatory layer 12 is to mask (using a photoresist, for example) working portion 18 (penetrable to light during operation) and to deposit the compensatory layer 12 on the useless portion 16 (impenetrable to light during operation). Next, a photoresist layer is removed and an anti-reflection layer is deposited. The advantage of this embodiment is that the optical performance of the substrate is not affected by any layers deposited on the lower side.

In particular, in the two preferred embodiments of the present invention, there are two alternative methods of deposition procedures. In the first alternative method, a compensatory layer may be deposited on the lower side until the deposition process on the upper side is finished. For example, a stack of 56 H and 83 L in total can be deposited alternately on the upper side first, and then deposit alternately compensatory layer of 50 H and 78 L in total, and an anti-reflection layer of 6 H and 4 L in total are deposited alternately on the lower side subsequently. The second alternative method is to deposit films on the upper side or lower side by turns. For example, a layer of 6 H and 4 L in total is deposited alternately on the upper side first, another layer of 6 H and 4 L in total is deposited alternately on the lower side subsequently, and then the deposition process is repeated on the upper side and lower side until all desired films are deposited. Although the first method is effective and economical, it cannot be employed in all processes. For example, if the substrate thickness is 50 µm and the desired number of layers deposited is 50 (4 µm per layer), when the 25$^{th}$ layer is deposited the substrate may bend. To avoid this, the second method is essential for the present invention.

In conclusion, the present invention provides a deposition method for balancing the film stress on both sides of the substrate without affecting the original optical performance. The deposition method is deposition of thin films of approximate thickness or approximate layers on the upper side and lower side to solve the unbalanced film stress on both side of the substrate. In particular, the compensatory layer in preferred embodiments of the present invention is designed according to the halfwave rules and the optimum design methods. Other optical methods also employed in design of the compensatory layer also are within the scope of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A deposition method for balancing film stress on an optical component, said deposition method comprising:
   depositing at least an optical film of a predetermined thickness on a first side of said optical component; and
   depositing at least a compensatory layer on a second side to compensate for a thickness difference between said first side and said second side, wherein said compensatory layer comprises an optical absentee layer.

2. The deposition method of claim 1, wherein said optical film of said predetermined thickness comprises thin films of high or low refractive index materials.

3. The deposition method of claim 1, wherein said compensatory layer is designed according to the halfwave rules and the optimum design methods not to affect optical performance of said first side.

4. The deposition method of claim 1, wherein said optical absentee layer consists of a plurality of high refractive index material thin films and a plurality of low refractive index material thin films.

5. A deposition method for balancing film stress on an optical component, said deposition method comprising:
   depositing at least an optical film of a predetermined thickness on a first side of said optical component; and
   depositing at least a compensatory layer on a useless portion of a second side to compensate for a thickness difference between said first side and said second side, wherein said second side of said optical component further comprises a working portion surrounded by the useless portion.

6. The deposition method of claim 5 further comprising: depositing an optical film on the working portion of said second side.

7. The deposition method of claim 5 further comprising: depositing nothing on the working portion of said second side.

8. The deposition method of claim 4, wherein the plurality of high refractive index material thin films are even layers of the high refractive index material thin films.

9. The deposition method of claim 4, wherein the plurality of low refractive index material thin films are even layers of the low refractive index material thin films.

10. The deposition method of claim 8, wherein each layer of said even layers of high refractive index material thin films is a ¼ wavelength thin film of high refractive index materials.

11. The deposition method of claim 9, wherein each layer of said even layers of low refractive index material thin films is a ¼ wavelength thin film of low refractive index materials.

12. The deposition method of claim 5, wherein said compensatory layer consists of even layers of high refractive index material thin films and even layers of low refractive index material thin films.

13. The deposition method of claim 12, wherein each layer of said even layers of high refractive index material thin films is a ¼ wavelength thin film of high refractive index materials.

14. The deposition method of claim 12, wherein each layer of said even layers of low refractive index material thin films is a ¼ wavelength thin film of low refractive index materials.

* * * * *